July 18, 1967 — E. WILDHABER — 3,331,217
GEAR-COUPLING MEMBER
Filed April 22, 1965
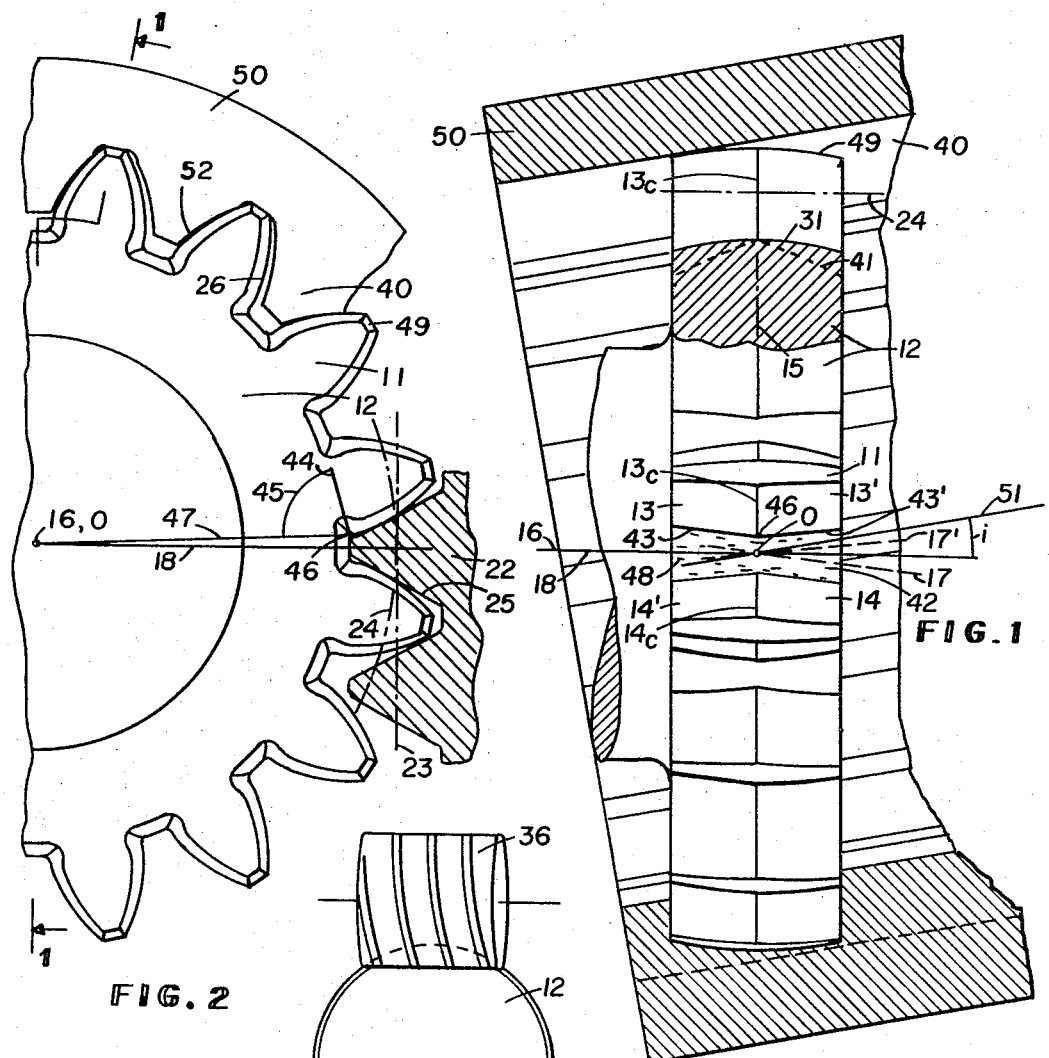
FIG. 1
FIG. 2
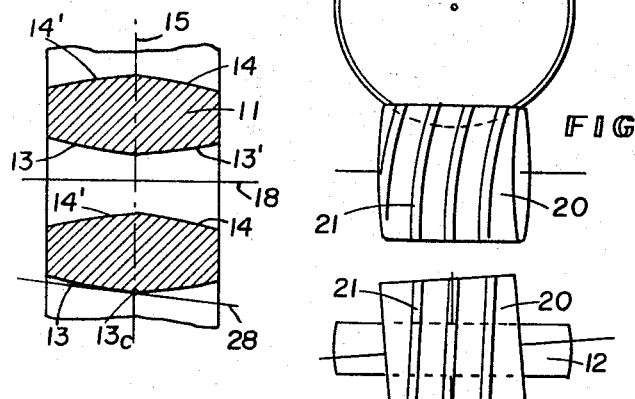
FIG. 3
FIG. 5
FIG. 6
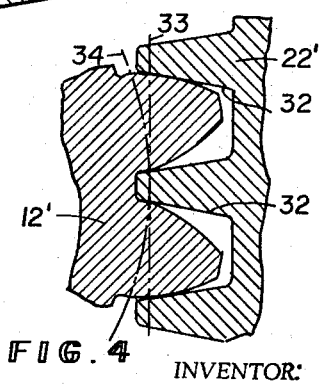
FIG. 4
INVENTOR:
Ernest Wildhaber United States Patent Office 3,331,217
Patented July 18, 1967

3,331,217
GEAR-COUPLING MEMBER
Ernest Wildhaber, Brighton, N.Y.
(124 Summit Drive, Rochester, N.Y. 14620)
Filed Apr. 22, 1965, Ser. No. 450,153
3 Claims. (Cl. 64—9)

The present invention relates to the production of gear-coupling members and to the shape produced thereby, and particularly to the production and shape of the crowned member of gear couplings that are to run under load at a limited range of angularities and not in alignment. By confining the range of angular adjustment increased load capacity and increased life are attainable.

Such crowned members, referred to as hubs, have tooth sides that meet in a ridge in a mid-plane perpendicular to the axis of the member. The teeth should be symmetrical with respect to said mid-plane and are convex in a cylindrical section coaxial with the member.

One object of the present invention is to devise a simple method of accurately and correctly producing such members, requiring a minimum of motions and only simple ones, so that an improved product is attained.

Another aim is to devise a method capable of producing a desirable curved tooth bottom on such members, without having to produce extra deep tooth ends that would weaken the teeth and produce undercut there, and a method capable of producing tooth bottoms that are continuous convex surfaces without break in the mid-plane.

Still other objects are to device a method using rotary tools such as hobs or threaded grinding members, that does not limit the size of the tool, but can be carried out efficiently also with large tools giving a good surface finish, and a method of using conventional tools.

A further aim is to provide a hub of a gear coupling designed to run within a limited range of angularities smaller than the maximum angularity for which the coupling is designed, that is of increased accuracy and increased degree of symmetry with respect to its mid-plane, and which bears the mark of the improved method at its tooth bottoms. A related object is to provide such a hub member with a tooth bottom profile that is a continuous convex curve without break in the mid-plane, similar to that of conventional low-angle gear couplings.

In the drawings:

FIG. 1 is partly an axial section of the hub of a gear coupling and partly a side view thereof, and an axial section taken along lines 1—1 of FIG. 2 of a sleeve member in engagement therewith, illustrating an embodiment of the invention.

FIG. 2 is a fragmentary end view of the hub shown in FIG. 1, taken along the hub axis, showing also a sleeve member set in axial alignment therewith, and furthermore illustrating a way of producing the hub.

FIG. 3 is a fragmentary portion of a mean cylindrical section coaxial with the hub, taken along circle 24 of FIG. 2 and developed into a plane.

FIG. 4 is a fragmentary cross-section of the hub, illustrating a modified way of generation.

FIG. 5 is a diagrammatic axial view of a hub illustrating its production with two hobs or threaded grinding members.

FIG. 6 is a front view corresponding to FIG. 5.

Gear couplings of the type referred to, run within a limited range of coupling angularities $i$ (FIG. 1) smaller than the maximum angularity for which they are designed to run, have been described in my Patent No. 2,922,294. They are useful especially at ample angularities where a conventional coupling requires so much crowning that the increased surface stresses would cut down its life drastically. The load capacity of the surface of the teeth is about inversely proportional to the crowning required. Decreased crowning is feasible by reducing the range of angularities at which the coupling is to run. Thus a coupling designed for a maximum angularity of say five degrees will have a much longer life if the minimum angularity can be fixed at say three degrees than if it has to run all the way between five degrees and zero angularity.

The teeth 11 of hub 12 (FIGS. 1 and 3) have side surfaces 13, 13' that meet in a ridge 13$_c$. The opposite side surfaces 14, 14' meet likewise in a ridge 14$_c$. The ridges lie in a mid-plane 15 that is perpendicular to the hub axis 16. The longitudinal profiles (FIG. 3) of the tooth sides are convex. Increased crowning shows up in longitudinal profiles that are more convex. Even without crowning, and full-length tooth bearing attained at a fixed operating angularity, the profiles are slightly convex, differing slightly from the straight profile of a helical surface.

In accordance with my invention, the diagonally opposite tooth sides 13, 14 or facets are produced with a tool moved relatively to the hub to describe a path 17 (FIG. 1) inclined to an axial plane 18 and askew to the hub axis 16. And the sides 13', 14' are produced by moving a tool to describe a path 17' oppositely askew to the hub axis. In other words, as the tool describes path 17 relatively to the hub 12, it produces one side (13) of the hub teeth on one side of mid-plane 15 and the opposite side (14) on the other side of said mid-plane. And as the tool describes path 17' it produces the remaining tooth sides (13', 14') of the hub teeth. Preferably the paths 17, 17' are in directions tangent to the longitudinal profiles (FIG. 3) in the mid-plane and tangent there to the cylindrical sectional surface.

The method will be particularly described as applied to hobs and threaded grinding members.

FIGS. 5 and 6 show a hub 12 in engagement with a rotary tool 20 having working portions disposed in a helical thread 21. The tool may be a cylindrical hob or a threaded grinding member and may contain a single thread or multiple threads. In operation the tool 20 and the hub 12 under production are turned on their respective axes at the inverse ratio of the thread number of the tool and the tooth number of the hub. Feed motion is effected between tool and hub in a plane containing the hub axis. This feed motion is ordinarily in a curved path concave towards the hub axis. The feed motion may be split up into a component in the direction of the hub axis and into a depthwise radial component at right angles thereto. The thus far named motions are the conventional motions. But now a timing change continuously in one direction is added to produce a relative path askew to the hub axis. If it were not for the varying depthwise component of the feed motion, the threaded tool would produce helical tooth sides.

In its feed motion a hob or threaded grinding member envelops and describes the tooth surfaces of a rack (22, FIG. 2). These surfaces are here concavely curved. The rack meshes with the hub so that a pitch plane 23 rigid with the rack rolls without sliding on a cylindrical pitch surface 24 rigid with the hub and coaxial therewith, whereby the hub teeth are gradually generated from one end to the other. The side profiles 25 of the rack section 22 have the same inclination or pressure angle as the tooth profiles 26 of hub 12 have at the pitch surface 24. Preferably the direction of the relative feed path coincides with the direction in the mid-plane of the side surfaces 13, 14. In other words, the rotary tool and the hub are timed as if for producing helical teeth whose helix angle in the pitch surface 24 matches the inclination of the tangent (28 on side 13) at point 13$_c$ for the mid-plane 15 (FIG. 3). The rate of depth feed in the mid-plane is then zero, and no time is lost between leaving surface facet 13 and starting on surface facet 14. The profile of the root surface in an axial section is a continuous curve without break, such as shown at 31 in FIG. 1. And the root surface itself is a continuous surface without break or ridge in the mid-plane.

The amount of crowning produced on the tooth sides at a given curvature of the root profile depends on the profile inclination or pressure angle of the rack and of the tool. The crowning required depends on the range of angularities at which the coupling is to run. The smaller this range, the less crowning is needed and the less crowning should be applied for maximum load capaicty and life.

In accordance with the invention the crowning of the tooth sides, at a given crowning of the tooth bottom or root surface, is controlled with the profile inclination of the tool and of the rack which it envelops. FIG. 4 shows a rack 22′ of decreased profile inclination, but having the same normal distance between parallel profiles 32. Its profile inclination matches the profile inclination of the hub teeth nearer to their tooth bottom. During generation a pitch plane 33 of the rack rolls on a cylindrical pitch surface 34 of the hub 12′, and the tool and its set-up and motion correspond to this generation. Generation with tools of different profile inclination is well known in the gear art and does not need to be gone into at length. The diameter of the generating pitch surface 34 is smaller than that of surface 24.

In practice the profile inclination of the generating rack is decreased from that of rack 22 by at least twenty percent.

While tool 20 generates the tooth sides 13, 14, the remaining tooth sides 13′, 14′ are preferably generated by a threaded tool 36 (FIG. 5) that has a hand opposite to that of tool 20. Tool 36 is shown as a right hand tool while tool 20 is a left hand tool. These tools may be used successively on a standard machine, or simultaneously on a machine with two tool spindles.

With tools of opposite hand exact symmetry of the teeth to the mid-plane of the hub is readily attainable. Tools of the same hand ordinarily produce a departure from exact symmetry increasing with increasing lead angle of the tool, being negligible at really small lead angles. Although the departure is curable, the remedy is quite complicated and requires an additional feed component, such as an additional varying slight timing change.

To produce the crowned teeth on a hub or part 12, the threaded tools 20, 36 and the part are rotated on their respective axes at the inverse ratio of the thread number of each tool and the tooth number of the part. When a tool contains a single thread of several convolutions, the tool makes as many turns per turn of the part as there are teeth in the part. Feed motion in a curved path is effected between the tools and the part in an axial plane of the part, to relatively move the tools 20, 36 in the same average direction across the face of the part. A timing change is applied to each of the two tools in direct proportion to the component of the feed motion axially of the part, as if one tool were to produce right hand helical tooth surfaces and the other tool were to produce left hand helical tooth surfaces. This means that the rotation of one tool is advanced while the rotation of the other tool is retarded; and the machine should have provision to do this. On each tool this timing change is continuously in one direction.

In this way one tool produces one side (13) of the teeth on one side of the mid-plane and the opposite side (14) on the other side of the mid-plane. The other tool produces the remaining side surfaces (13′, 14′) of the teeth.

The method is for producing hubs whose tooth sides 13, 13′ and 14, 14′ meet in a ridge 13$_c$, 14$_c$ respectively in the mid-plane 15. The ridge may be very blunt; that is the joining surfaces may be almost in alignment with each other. This occurs at low minimum angularities. The ridge may be left as it comes from the machine that produces the tooth sides. Or it might be rounded off, if desired. Such hubs produced by the described method differ from hubs produced by any other known method in the improved shape of the tooth bottom, outside of an attainable higher accuracy.

The profile of the tooth bottom or root surface in an axial section approximates a circular arc 31 centered at O on the hub axis, giving a uniform clearance from the inside ends of the sleeve teeth 40 at all angularities. All other known methods produce here tooth bottoms that meet at an angle in the mid-plane, like bottoms 41 indicated in dotted lines in FIG. 1.

Excessive depth at opposite tooth ends is avoided, which would weaken the teeth and produce undercut.

The tooth bottoms 42 (FIG. 1) produced by the method widen from the mid-plane towards the tooth ends, and the approximately straight-appearing border profiles 43, 43′ thereof meet at an angle in the mid-plane, in a radial view at right angles to the hub axis. In the preferred embodiment the plane of this angle is parallel to the hub axis 16 and extends peripherally of the hub.

The plane of this angle appears in the axial view, FIG. 2, as the tangent 44 of the border profile at point 46 of the ridge. It includes an angel 45 larger than 45 degrees with the radial direction 47.

In the radial view, FIG. 1, the borders of the tooth bottom follow paths 17, 17′ that cross each other in the form of a flat X. At the mid-plane 15 the root surface extends in a direction parallel to the hub axis. No other known method produces such tooth bottoms on the hubs referred to. The tooth bottom may retain tool marks 48 that extend in directions crossing at an angle.

The hubs preferably keep the known spherical outside or top surface 49 of the teeth, centered at O.

The sleeve member 50 has straight teeth 40 internally provided thereon. They may be involute teeth parallel to sleeve axis 51.

When the sleeve member is set in alignment with the hub, which is not a running position, its tooth profiles 52 do not quite match the profiles of the hub, but tend to contact them adjacent the root of the sleeve profiles (FIG. 2). This is especially true on couplings designed for ample minimum angularities.

Having thus described my invention, what I claim is:

1. A gear coupling for operating at angles between a maximum and a minimum angle other than zero, comprising a sleeve member having internal, longitudinally straight teeth of concave profile, and a hub member having longitudinally crowned teeth projecting outwardly from a body portion and engaging said straight teeth, said hub member having longitudinally convex tooth sides meeting in a ridge in the mid-plane longitudinally of said hub member and having tooth bottoms following two paths that cross each other at an angle in said mid-plane, said bottoms being convex in planes containing the axis of said hub member.

2. A gear coupling according to claim 1, wherein the hub member has longitudinally convex tooth tops and tooth bottoms extending smoothly from end to end without ridge while its tooth sides meet in a ridge in said mid-plane.

3. A gear coupling member having crowned teeth spaced about an axis, the tooth bottoms thereof being convexly curved lengthwise and widening from a mid-plane towards the tooth ends so that each bounding line of a tooth bottom follows two paths that cross each other at an angle in the mid-plane, the side surfaces of said teeth being convexly curved lengthwise and having convex profiles in planes perpendicular to the axis of rotation, the mean curvatures radii of said profiles being smaller than the outside radius of said member.

References Cited

UNITED STATES PATENTS

| | | | |
|---|---|---|---|
| 2,035,171 | 3/1936 | Loewus | 64—9 |
| 2,922,294 | 1/1960 | Wildhaber | 64—9 |
| 3,013,411 | 12/1961 | Wahlmark | 64—9 |
| 3,054,275 | 9/1962 | Ongaro | 64—9 |

FRED C. MATTERN, Jr., *Primary Examiner.*

HALL C. COE, *Examiner.*